June 7, 1960
H. B. DARDARIAN ET AL
2,939,742
FOLDABLE VEHICLE TOP
Filed April 3, 1958
3 Sheets-Sheet 1
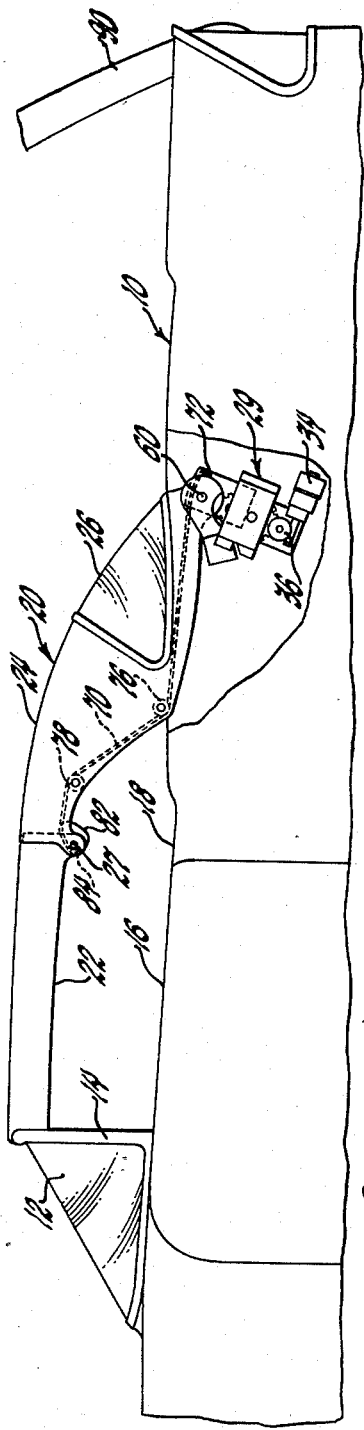
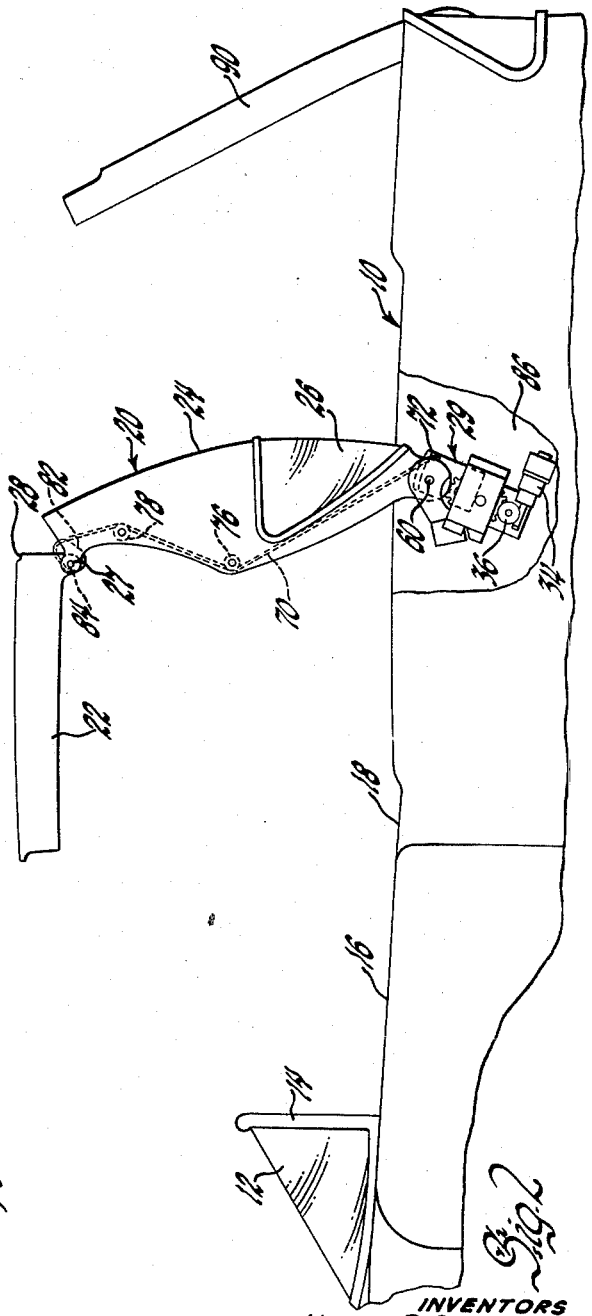
INVENTORS
*Harry B. Dardarian,*
*Joseph H. Gilson, &*
BY *Gordon R. Swanson*
*W. S. Pettigrew*
ATTORNEY

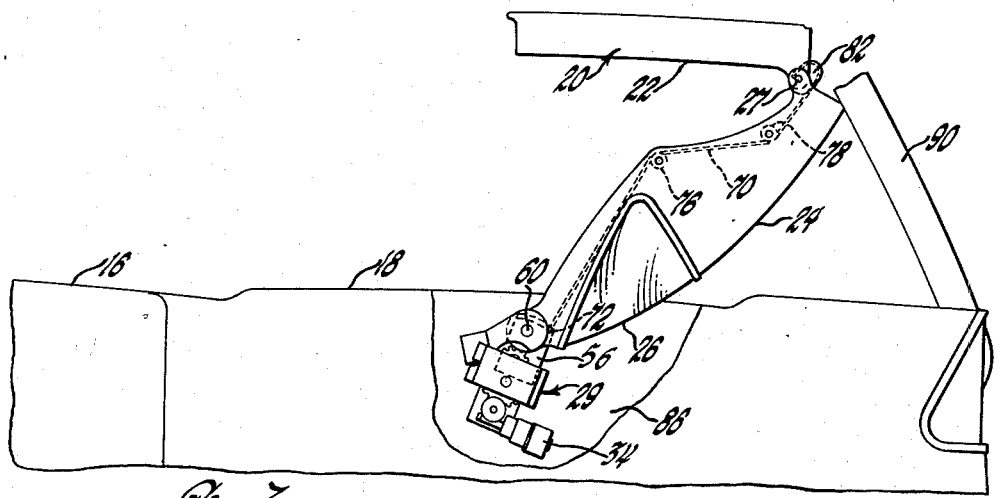
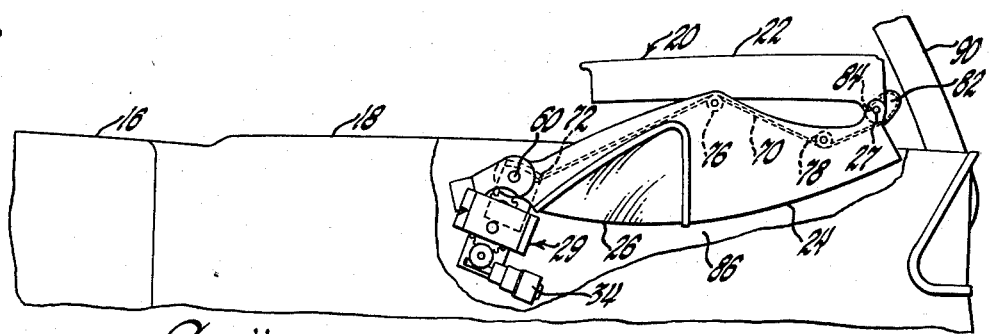
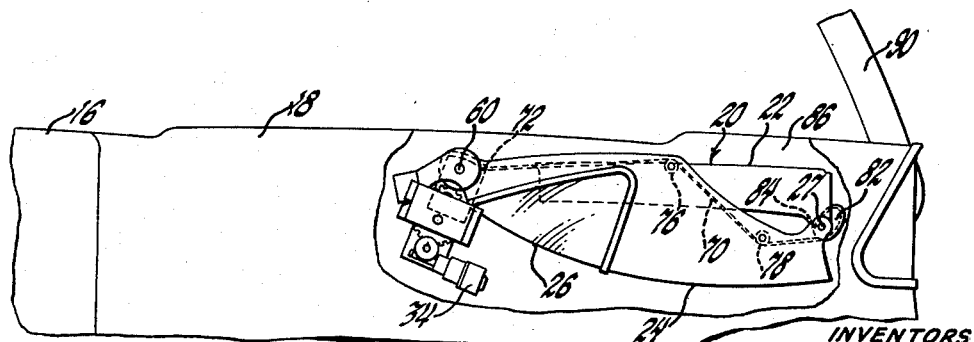

June 7, 1960

H. B. DARDARIAN ET AL 2,939,742

FOLDABLE VEHICLE TOP

Filed April 3, 1958

INVENTORS
Harry B. Dardarian,
Joseph H. Gilson, &
BY Gordon R. Swanson
W. S. Pettigrew
ATTORNEY United States Patent Office 2,939,742
Patented June 7, 1960

2,939,742
FOLDABLE VEHICLE TOP

Harry B. Dardarian, Oak Park, Joseph H. Gilson, Warren, and Gordon R. Swanson, Detroit, Mich., assignors to General Motors Corporation, Detroit, Mich., a corporation of Delaware Filed Apr. 3, 1958, Ser. No. 726,227

7 Claims. (Cl. 296—107)

This invention relates to foldable vehicle tops and more particularly to an improved means for controlling the folding movement of a vehicle top having a number of generally rigid foldable top sections.

In many of the presently known or used foldable tops having a number of rigid foldable top sections, the mechanism controlling the folding movement of the top sections is often complicated and cumbersome so as to require an inordinate amount of space within the top sections and within the vehicle body and also frequent adjustment and repair. Thus, the body may have to be specially built and the passenger space and head room space reduced in order to accommodate the mechanism for controlling the folding movement of the top sections.

Accordingly, one of the primary objects of this invention is to provide an improved means for controlling the folding movement of a number of generally rigid foldable top sections which will take up a minimum amount of space within the top sections and within the body and will not require any reduction of either the head room or passenger space below normal passenger requirements.

In its preferred embodiment, the controlling means of this invention is particularly intended for use with foldable tops which include a rearward rigid top section pivotally mounted on the body for swinging movement between raised and lowered positions and a forward top section which is pivotally interconnected with the rearward top section and is foldable inwardly and outwardly thereof as the top is lowered and raised. Thus, as the top is lowered, the forward section folds inwardly of the rearward section under gravity; and, when the top is raised, the forward section folds outwardly of the rearward section against gravity.

The controlling means of this invention takes advantage of the influence of gravity to accurately and positively control the folding movements of the forward section relative to the rearward section as the top is both raised and lowered. The controlling means generally includes a flexible cable of fixed length which extends between the body and the forward top section with each end of the cable being anchored to irregularly shaped pulley members fixed to the forward top section and to the body and controlling the effective length of the cable as the cable wraps and unwraps around the members.

Further objects and features of this invention will be readily apparent from the following specification and drawings wherein:

Figure 1 is a partial side elevational view of a vehicle body having a foldable top embodying a controlling means according to this invention.

Figure 2 is a view similar to Figure 1 and showing the top in a partially folded position.

Figure 3 is a view similar to Figure 2 and showing the top in a further folded position.

Figure 4 is a view similar to Figure 3 and showing the top in an almost completely folded position.

Figure 5 is a view similar to Figure 4 and showing the top in a completely folded position.

Figure 6:
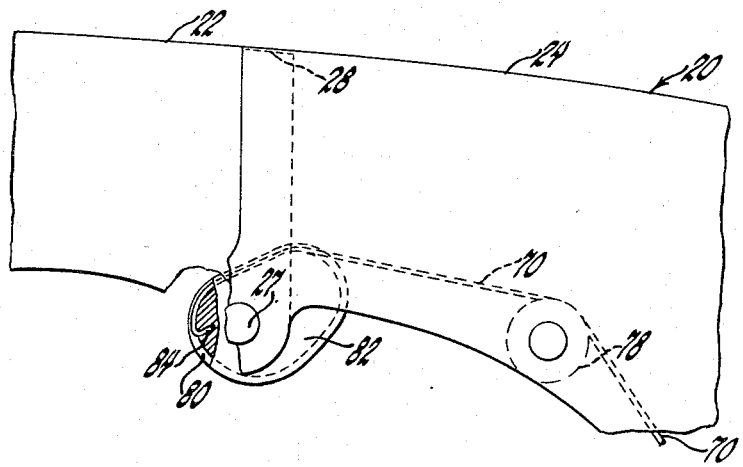
Figure 6 is an enlarged view of a portion of Figure 1 with parts thereof broken away for clarity of illustration, and showing one of the pulley members controlling the effective length of the cable.

Referring now to Figure 1 of the drawings, a vehicle body 10 of the two-door sedan type includes a windshield 12 provided with a windshield header 14 which extends across the upper edge of the windshield between opposite sides of the body, and a front door 16 on either side thereof which provide access to the passenger compartment 18 within the body. A foldable top 20 is provided for the body and includes a forward, substantially rigid section 22 and a rearward, substantially rigid top section 24 which is provided with a vehicle backlite 26 rigidly mounted therein, although the backlite may be otherwise supported on the section 24 or on the body if so desired. The forward and rearward top sections are pivotally connected at each side thereof by a hinge pin 27 fixed to section 22, and it will further be noted that the forward section is slightly offset at 28 at its rearward edge portion so that the rearward edge portion will be received within and beneath the forward edge portion of the rearward section when the top is in raised position as shown in Figure 1 of the drawings.

Figure 7:
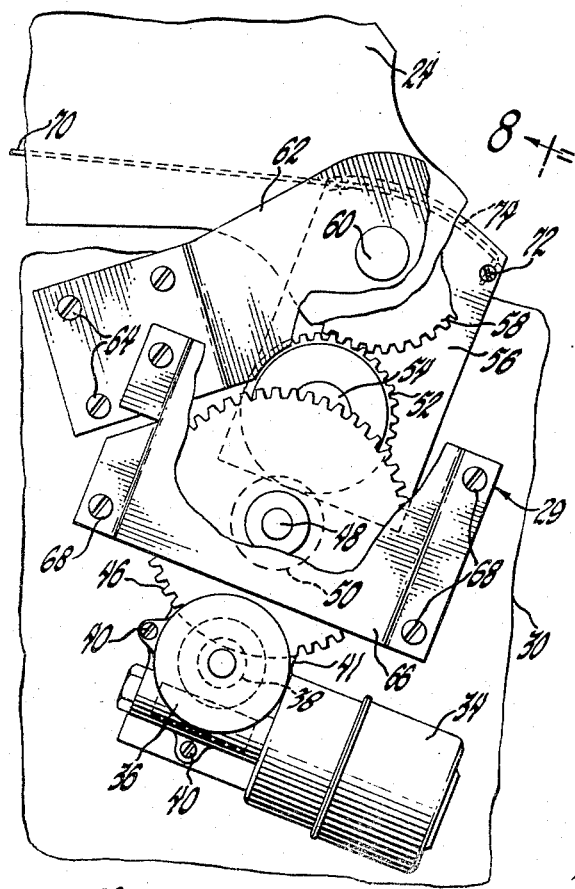
Figure 7 is an enlarged view of a portion of Figure 1 with parts thereof broken away for clarity of illustration and showing the other pulley member controlling the effective length of the cable and the power operating means for the top.
Figure 8:
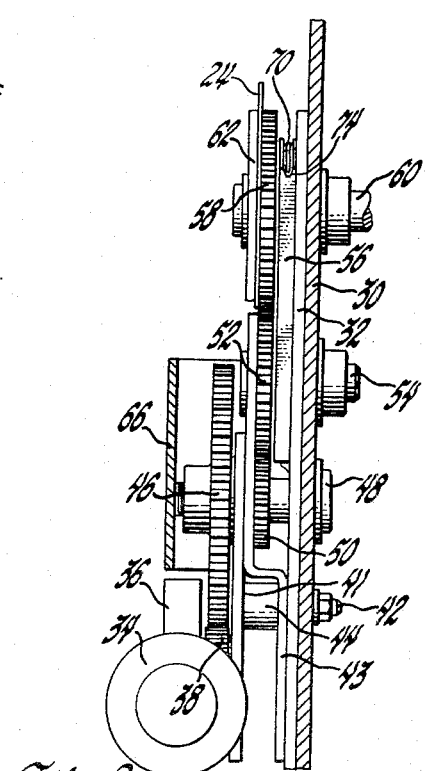
Figure 8 is a view taken on the plane indicated by line 8—8 of Figure 7.

Referring now particularly to Figures 1, 7 and 8, the power operating means 29 for the top will be described. Before proceeding with a description of this, it will be understood that the top may be otherwise operated, either manually or by other power operating means, and that the power operating means may be provided on one or on both sides of the body as desired.

As best shown in Figure 8, the rear quarter body inner panel 30 is provided with a reinforcing panel 32 immediately outboard thereof. An electric motor 34 drives through a gear box 36 of common type which includes an input worm driven by the motor and driving an output worm wheel which in turn drives a pinion 38. The gear box is bolted at 40 to a bracket 41 which is bolted at 42 to panels 30 and 32 and one leg of an offset bracket 43, with a spacer 44 being provided between the brackets 41 and 43. The pinion 38 drives a gear 46 of larger diameter which is secured to a shaft 48 rotatably mounted on brackets 41 and 43 and on the panels 30 and 32. A pinion 50 of smaller diameter than pinion 46 is also fixed to the shaft 48 and drives a pinion 52 secured to a shaft 54. The shaft 54 has one end thereof rotatably supported by the bracket 43 and the other end thereof rotatably supported by panels 30 and 32 and also extending through a pulley member 56 which is welded to panel 32 so as to be fixedly mounted on the body for a purpose to be hereinafter described. The pinion 52 drives a gear 58 fixed to the rearward section 24 of the foldable top which is swingably mounted on a shaft 60. The shaft is supported by an offset bracket 62 secured to panels 30 and 32 at 64, by the panels 30 and 32, and also by the pulley member 56. As previously mentioned, only one or both sides of the top may be driven by the power operating means. If both sides of the top are driven, then a gear 58 will be provided on each side thereof. However, if only one side is driven, then only the one gear 58 will be provided; but in each instance, both sides of the rearward section 24 will be rotatably mounted on the shaft 60 which spans the body transversely thereof and defines a horizontal axis of swinging movement of the foldable top on the body. A bracket 62 bolted to panel 30 at 64 rotatably receives the one end of the shaft 60 and a cover bracket 66 bolted to panel 30 at 68 covers a portion of the gear drive train.

Referring now particularly to Figure 7 of the drawings, a cable 70 has the rearward end thereof anchored at 72 to the pulley member 56, with the member being provided with an irregularly shaped groove 74 which receives the rearward end portion of the cable when the top is in raised position. Cable 70 extends forwardly from the anchor 72 around a pair of idler pulleys 76 and 78, each of which is rotatably mounted on the rearward section 24 of the top 20 adjacent the side edge thereof. The forward end portion of the cable 70, as best shown in Figure 6, is received within a portion of the groove 80 of an irregularly shaped pulley member 82, with the forward end of the cable being anchored to the member 82 at 84. Member 82 is fixed to the pin 27 which pivotally interconnects the forward and rearward sections 22 and 24 at the top 20.

Referring now particularly to Figures 1 through 5 of the drawings, the sequence of folding movement of the top from a raised position to a lowered position will be described. Upon operation of the electric motor 34 to drive the pinion 52 in a counterclockwise direction, the gear 58 will be driven in a clockwise direction to swing the rear section 24 of the top 20 in the same direction or rearward and downward about the axis of the shaft 60. During the initial rearward swinging movement of the section 24 from its position of Figure 1 to its position of Figure 2, the rearward end portion of the cable 70 moves out of the groove 74 of pulley member 56 to take the bend out of the cable between anchor 72 and pulley 76 so that the cable becomes substantially straight between the anchor 72 and the pulley 76. This produces slack in the cable between the anchors 72 and 84 and the forward section 22 of the top will, therefore, start to swing downward and inward of the rearward section 24 under gravity. This movement of section 22 swings the pulley member 82 and the pin 27 in a counterclockwise direction to allow more of the cable to be received within groove 80 and thereby partially take up the slack in the cable to control the partially folded position of the forward section 22 relative to the rearward section 24 whereby the top moves to its position of Figure 2.

Thereafter, upon continued rearward and downward swinging movement of the rearward section 24 of the top, the forward section 22 initially remains in a substantially horizontal position until it has substantially cleared the passenger compartment 18, as can be seen from a comparison of Figures 2 and 3, and then folds within the rearward section 24 as the rearward section moves within the body top storage compartment 86. Since the anchor 72 of the cable 70 is rearward of the axis of swinging movement of the section 24 as defined by the shaft 60, the cable swings through a shorter arc than the top section 24 and continually slackens as the rearward section 24 swings from its position of Figure 3 to its position of Figure 5. This slack in the cable is partially taken up by more of the cable being received within groove 80 of the pulley member 82 as the forward section 22 swings downward and inward of the rearward section 24 and is finally disposed within this section when the top is in a fully lower position as shown in Figure 5.

It must be remembered that the length of the cable always remains the same between its anchor 72 on the body and its anchor 84 on the pulley 82. However, the effective length of the cable continually changes as the top is lowered, with the initial increase in effective length or slack in the cable being due to the removal of the rearward end portion of the cable from the arcuately shaped groove 74 of the pulley member 56 so that the forward section 22 will initially swing downward and inward of the section 24 under gravity during the initial lowering movement of the top, with the position of section 22 being controlled by the amount of slack taken up by pulley 82. Thereafter, since the anchor 72 of the cable is rearward of the pivotal axis 60 of the section 24 on the body, the cable will swing through an arc having its center at the anchor 72 while the top will swing through a greater arc having its center at the axis of the shaft 60. Thus, the cable will again be slackened or the effective length thereof increased and this increase in effective length is again partially taken up by the pulley member 82 to continually control the swinging movement of the forward section 22 downward and inward of the rearward section 24 under gravity as the rearward section moves within the body.

When the top is raised, the reverse of the above-mentioned operation takes place, and it is believed that no description need be given of this.

It will be remembered that both of the pulley members 56 and 82 are irregularly shaped in order to control the increase and decrease in the effective length of the cable 70 as the top is lowered and raised. Since the shape of these pulley members will necessarily depend on the body conditions of the particular body on which the top 20 is mounted, it is difficult to set any definite shape of the members since the shape will vary with each body. It will be further understood that either one or both of the anchors 72 and 84 of the cable 70 on the pulley members may be adjustable so as to place the cable in a taut condition when the top is in a raised position and thereby initially set the effective length of the cable, since this effective length necessarily increases and decreases as the top is both lowered and raised.

It will be understood, of course, that a suitable storage compartment 86 for the top 20 is provided within the rearward portion of the body, and a cover 90 may be provided for this compartment so as to close the compartment when the top 20 is either in a fully raised or a fully lowered position.

Thus, this invention provides an improved means for controlling the folding movement of a vehicle top having a number of generally rigid foldable top sections. The controlling means controls the folding movement of one section of the top relative to the other section as the other section is moved within the body.

We claim:

1. In a vehicle body, the combination comprising, a folding top structure supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means mounting one end of said flexible member on said body, means permitting slack in said flexible member during movement of said top structure from a raised to a lowered position to increase the effective length of said member and allow said one section to swing relative to said other section under gravity, take up means secured to said one top section and controlled thereby during movement of said top structure, and means securing the other end of said flexible member to said take up means, said take up means partially taking up the slack in said flexible member at a predetermined rate during movement of said top structure to control the increase in effective length thereof and thereby control the position of said one section relative to said other section.

2. In a vehicle body, the combination comprising, a folding top structure supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means mounting one end of said flexible member on said body, means permitting slack in said flexible member during movement of said top structure from a raised to a lowered position to increase the effective length of said member and allow said one section to swing relative to said other section under gravity, take up pulley means secured to said one top section for movement therewith relative to said other top section during movement of said top structure, and means securing the other end of said flexible member to said take up pulley means, said take up pulley means wrapping said flexible member therearound to take up the slack in said flexible member at a predetermined rate during movement of said top and control the increase in effective length thereof to thereby control the position of said one section relative to said other section.

3. In a vehicle body, the combination comprising, a folding top structure supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means fixedly mounting one end of said flexible member on said body, take up means on said body engageable with said flexible member in the raised position of said top structure, said flexible member being disengaged from said take up means to permit slack and increase the effective length of said member during movement of said top structure from a raised to a lowered position to allow said one section to swing relative to said other section under gravity, second take up means secured to said one top section for movement therewith during movement of said top structure, and means securing the other end of said flexible member to said second take up means, said second take up means taking up the slack in said flexible member at a predetermined rate during movement of said top structure to control the increase in effective length thereof and thereby control the position of said one section relative to said other section.

4. In a vehicle body, the combination comprising, a folding top structure swingably supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means mounting one end of said flexible member on said body remote from the axis of swinging of said top structure whereby said member swings through a different arc than said top structure and slackens to increase the effective length thereof during movement of said top structure from a raised to a lowered position to allow said one section to swing relative to said other section under gravity, take up means secured to said one top section for movement therewith during movement of said top structure, and means securing the other end of said flexible member to said take up means, said take up means partially taking up the slack in said flexible member during movement of said top structure to control the increase in effective length thereof and thereby control the position of said one section relative to said other section.

5. In a vehicle body, the combination comprising, a folding top structure swingably supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means mounting one end of said flexible member on said body remote from the axis of swinging of said top structure whereby said member swings through a different arc than said top structure and slackens to increase the effective length thereof during movement of said top structure from a raised to a lowered position to allow said one section to swing relative to said other section under gravity, take up pulley means secured to said one top section for movement therewith during movement of said top structure, and means securing the other end of said flexible member to said take up pulley means, said take up pulley means wrapping said flexible member therearound to take up the slack in said flexible member at a predetermined rate during movement of said top structure and control the increase in effective length thereof to thereby control the position of said one section relative to said other section.

6. In a vehicle body, the combination comprising, a folding top structure swingably supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means mounting one end of said flexible member on said body remote from the axis of swinging of said top structure whereby said member swings through a different arc than said top structure and slackens to increase the effective length thereof during movement of said top structure from a raised to a lowered position to allow said one section to swing relative to said other section under gravity, irregularly shaped pulley means secured to said one top section for movement therewith during movement of said top structure, and means securing the other end of said flexible member to said pulley means, said pulley means wrapping said flexible member therearound and having a shape adapted to take up the slack in said flexible member at a predetermined rate during movement of said top structure to control the increase in effective length thereof and thereby control the position of said one section relative to said other section.

7. In a vehicle body, the combination comprising, a folding top structure swingably supported on said body for movement between raised and lowered positions and including a pair of top sections, means pivotally connecting said sections for swinging movement of one section relative to the other section under gravity during movement of said top structure, a flexible member of fixed predetermined length extending between said body and said one top section and having an effective length permitting said top sections to be disposed in an unfolded position when said top structure is in a raised position, means mounting one end of said flexible member on said body remote from the axis of swinging of said top structure whereby said member swings through a different arc than said top structure and slackens to increase the effective length thereof during movement of said top structure from a raised to a lowered position to allow said one section to swing relative to said other section under gravity, an irregularly shaped pulley member secured to said one top section at the pivotal axis thereof for movement therewith during movement of said top structure, and means securing the other end of said flexible member to said pulley member, said pulley member wrapping said flexible member therearound and having a shape to take up the slack in said flexible member at a predetermined rate during movement of said top structure to control the increase in effective length thereof and thereby control the position of said one section relative to said other section.

References Cited in the file of this patent

UNITED STATES PATENTS

| | | |
|---|---|---|
| 2,007,873 | Paulin | July 9, 1935 |
| 2,770,489 | Garvey et al. | Nov. 13, 1956 |

FOREIGN PATENTS

| | | |
|---|---|---|
| 1,136,396 | France | May 13, 1957 |
| 179,916 | Switzerland | Dec. 16, 1935 |